No. 799,607. PATENTED SEPT. 12, 1905.
A. LINDGREN.
DISK HARROW.
APPLICATION FILED JUNE 1, 1905.

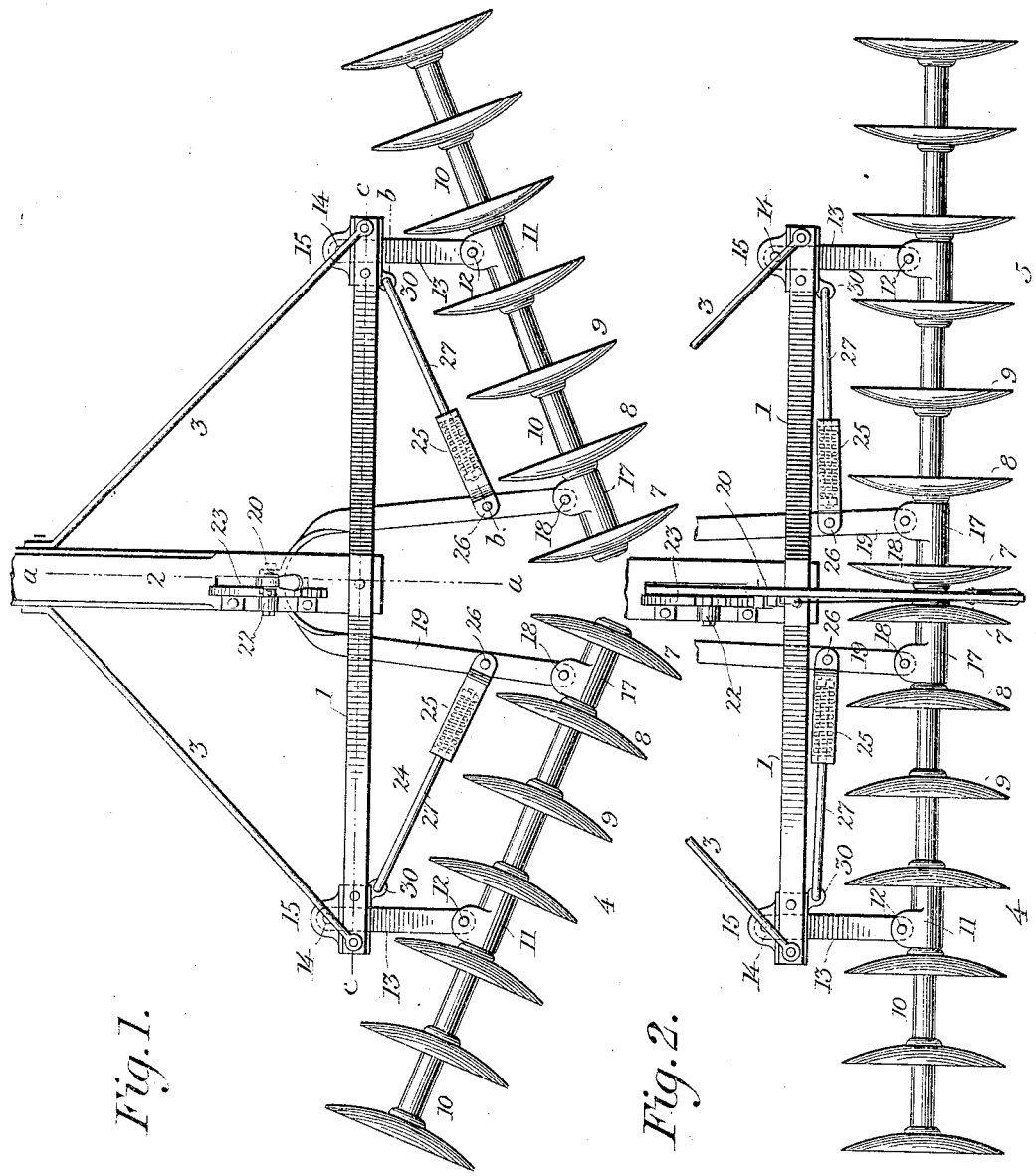

2 SHEETS—SHEET 2.

WITNESSES
D. Burdine
A. M. E. Kennedy

INVENTOR
August Lindgren
By P. J. Dodge
Attorney

UNITED STATES PATENT OFFICE.

AUGUST LINDGREN, OF MOLINE, ILLINOIS, ASSIGNOR TO MOLINE PLOW COMPANY, A CORPORATION OF ILLINOIS.

DISK HARROW.

No. 799,607.     Specification of Letters Patent.     Patented Sept. 12, 1905.

Application filed June 1, 1905. Serial No. 263,266.

*To all whom it may concern:*

Be it known that I, AUGUST LINDGREN, of Moline, county of Rock Island, and State of Illinois, have invented a new and useful Improvement in Disk Harrows, of which the following is a specification.

This invention relates to disk harrows; and it consists of improved means for receiving and taking up the end thrust of the disk gangs, which improved means will be fully described in the specification and the novel features pointed out in the claims.

Figure 3:
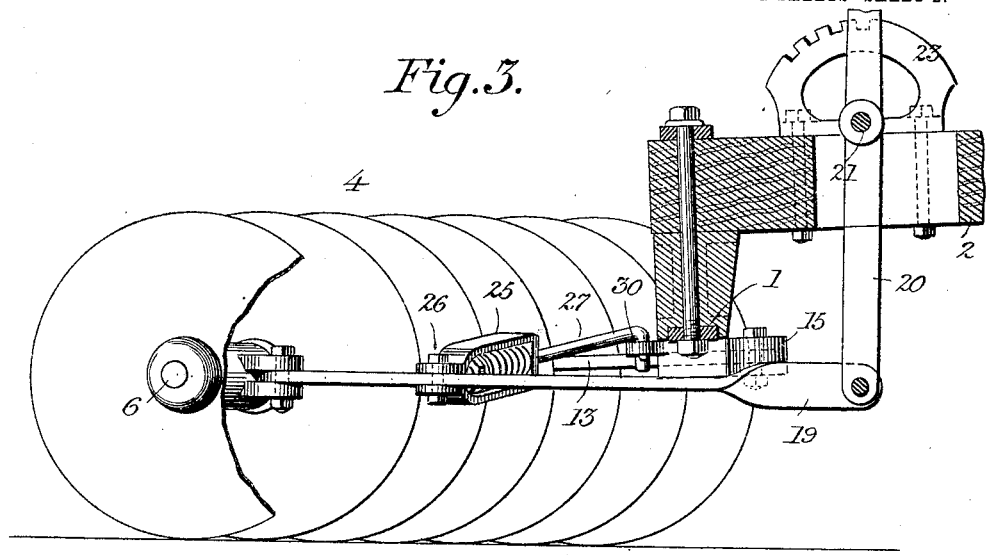
Figure 4:
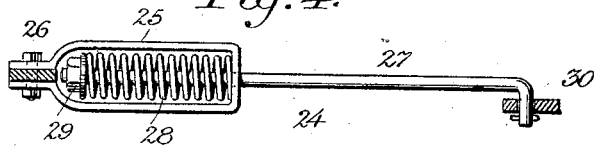
Figure 5:
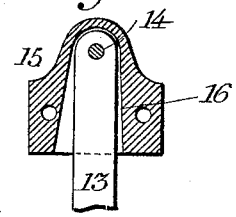
Figure 6:
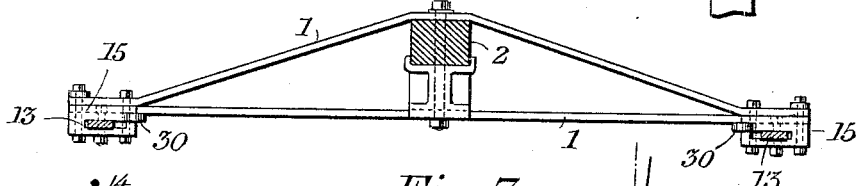
Figure 7:
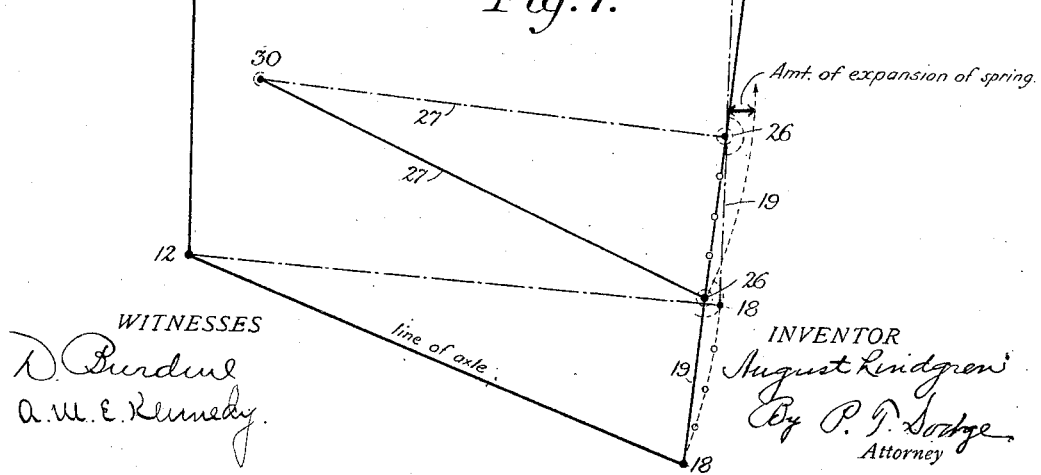

In the accompanying drawings, Figure 1 is a top plan view of a harrow having my invention embodied therein. Fig. 2 is a similar view showing the disk gangs adjusted with the disks at less inclination to the line of draft than that illustrated in Fig. 1. Fig. 3 is a vertical longitudinal sectional elevation on the line *a a* of Fig. 1, on an enlarged scale. Fig. 4 is a longitudinal central sectional elevation through one of the yielding buffer-links, on an enlarged scale, on the line *b b* of Fig. 1. Fig. 5 is a horizontal sectional plan view showing the connection of the pivotal link for the disk gang with the frame of the machine. Fig. 6 is a transverse sectional elevation through the truss-frame on the line *c c* of Fig. 1. Fig. 7 is a diagrammatic view illustrating the movements of the disk gang and the buffer-link when the gang is adjusted and showing the amount of expansion of the spring under such adjustments.

Referring to the drawings, 1 represents a transverse frame, preferably in the form of a truss, which is firmly fixed to the rear end of a tongue 2 and suitably braced by diagonal brace-rods 3, connected, respectively, to the ends of the truss-frame and to the sides of the tongue. Arranged in rear of the transverse frame end to end are two disk gangs 4 and 5, each of which comprises a horizontal supporting-shaft 6 and a series of disks 7 8 9, &c., mounted thereon and suitably spaced apart by intervening spools 10 in the usual manner. About midway between its ends each shaft is encircled by a bearing 11, having pivoted to it on a vertical pivot-bolt 12 the rear end of a forwardly-extending horizontal link 13, the front end of which is pivoted on a vertical bolt 14 within a bearing-box 15, fixed to the under side of the truss-frame at its outer end. A stop 16 is formed in the bearing-box at the outer side of the link in such position that while this link may swing inward on its axis to a limited extent its outward movement is prevented by this stop, the purpose of which will presently appear. Near its inner end each shaft is encircled by a second bearing 17, having jointed to it by a vertical pivot-bolt 18 the rear end of a strap 19, which extends forwardly below the truss-frame and has its forward end jointed to the lower end of a vertical hand-lever 20. The hand-lever is mounted on the tongue in a horizontal transverse axis 21 and is provided with a locking-dog 22, engaging a toothed quadrant 23, fixed to the tongue, the arrangement of the parts being such that by the operation of this hand-lever the inner end of the gang may be moved back and forth and the parts locked in the desired position, the disk gang during this back-and-forth movement pivoting on the pivot-bolt 12, which connects the rear end of the link 13 with the bearing 11.

The connection of the straps 19 with the adjusting-lever should be such as to allow of a slight play or pivotal action between the strap and the lever in order that this connection will not interfere with the endwise movement of the gang due to the end thrust, or the same result may be attained by fastening the forward end of the strap firmly to the lever as far as any lateral motion is concerned and forming the strap so that it will have a slight spring laterally in order that it may give to the end thrust.

In the present machine the adjusting-lever is shown adapted to operate both gangs in unison, the two connecting-straps being both connected with the lever and on opposite sides of the same. It is manifest, however, that two levers may be provided and the straps connected, respectively, with these levers in order to effect the independent adjustment of the gangs.

By the connection of the two gangs with the frame through the medium of the fore-and-aft links and the adjusting-straps in the manner described the gangs are movable bodily endwise in the direction of the end thrust and are also capable of a pivotal motion around a vertical axis for the purpose of adjusting the gangs, which motion, as described, is controlled by the adjusting hand-lever.

In order that the endwise motion of the gangs may be suitably controlled and subjected to a cushioning action, so as to take up the end thrust to which the gangs are in practice subjected, I provide each gang with a buffer device in the form of a yielding link 24, connected, respectively, with the adjusting-strap and with the frame of the machine and acting while holding the gangs to their work under normal conditions to yield in the event of the gangs being subjected to undue endwise pressure, such as the end thrust.

As seen in Figs. 1 and 3, each of the buffer-links comprises a ⊃-shape frame or yoke 25, having its free ends applied to the upper and under sides of the adjusting-strap 19 and pivoted thereto by a vertical pivot-pin 26. The opposite end of the yoke is provided with an opening through which is slidingly extended the inner end of a rod 27, encircled by a spiral spring 28, situated within the yoke and bearing at its inner end against an adjustable head 29 on the rod and bearing on its other end against the end of the yoke. The outer end of the rod 27 is jointed on a vertical axis to the truss-frame near the outer end of the latter, the connection of the rod with the frame being formed by the downwardly-bent end of the rod, which is seated loosely and confined in a vertical socket formed in a bracket-plate 30, extending rearwardly from the truss-frame.

From the construction described it will be observed that any motion of the gangs endwise inward is resisted at once by the spiral spring in the buffer member, which spring will be compressed by the inward movement of the yoke along the rod 27. It will be observed, further, that when the gangs are adjusted rearwardly at their inner ends in order that the disks will stand at a greater inclination to the line of draft, as shown in Fig. 1, the buffer-springs will be subjected to a greater degree of compression, due to the increasing distance between the points of attachment of the buffer member, and the spring consequently will offer a greater resistance to the end thrust of the gangs when in this position than when the gangs are adjusted to cause the disks to stand more nearly in the line of draft, in which position the end thrust will be correspondingly less severe. By the adjustments of the gangs therefore the resistance to the end thrust is automatically increased as the inclination of the disks is increased and is automatically diminished as the inclination of the disks is diminished.

By the application of the buffer devices in the manner described the end thrust of the gangs is borne by both bearings, being received directly by the outer bearing 11 and indirectly through the medium of the connection of the buffer device with the adjusting-strap by the inner bearing. This will greatly increase the life of these bearings.

The inner ends of the gangs are entirely disconnected, and they are consequently movable vertically independently, so as to follow any inaccuracies in the ground, and they may also be moved back and forth independently for the purposes of independent adjustments, which latter action may be provided for by employing, as heretofore stated, two adjusting-levers, one for each gang.

Having thus described my invention, what I claim is—

1. In a disk harrow, the combination with the disk gang, of means for adjusting the same to vary the inclination of the disks to the line of draft, a buffer device for receiving the end thrust of the gang, and means controlled by the adjustment of the gang for decreasing the resistance offered by the buffer device as the plane of the disks approach the line of draft.

2. In a disk harrow, the combination with a disk gang, of means for increasing and diminishing the inclination of the disks to the line of draft, a buffer device acting to resist the end thrust of the gang, and means for increasing the resistance of the buffer when the inclination of the disks to the line of draft is increased and for decreasing the resistance of the buffer when the inclination of the disks to the line of draft is diminished.

3. In combination with the frame, a disk gang, a link connection between the disk gang and frame formed to permit the disk gang to move endwise, and a buffer device acting respectively on the frame and disk gang and acting to resist the end motion of the gang.

4. The combination with the frame, of a disk gang movable endwise relative to the frame, and a yielding link connected respectively with the frame and disk gang.

5. The combination with the frame, of a disk gang adjustable around a vertical axis, an adjusting-lever sustained by the frame, a fore-and-aft member connecting the disk gang with the lever, and a yielding link connected respectively with the frame and the fore-and-aft member.

6. In a disk harrow the combination with the frame, of a disk gang, an inner fore-and-aft link pivotally connecting the disk gang with the frame, an outer fore-and-aft link pivotally connecting the disk gang with the frame, and a yielding connection between the frame and the inner link.

7. In combination with the frame, a disk gang, two fore-and-aft links connecting the disk gang pivotally with the frame, and a yielding connection between the frame and one of the links.

8. In combination with the frame, a disk gang, an outer fore-and-aft link connecting the disk gang pivotally with the frame, an adjusting-lever, a fore-and-aft adjusting-link connected at its front end with the lever and pivoted at its rear end to the disk gang, and a yieldable link pivoted at its outer end to the frame and at its inner end to the adjusting-link.

9. In a disk harrow the combination with the frame, of a disk gang adapted to be moved endwise by end thrust, means for adjusting said disk gang to vary the inclination of the disks to the line of draft, a spiral spring acting on the disk gang and tending to resist the end thrust, and means controlled by the adjustment of the gang for permitting the spring to expand as the plane of the disks approach the line of draft.

In testimony whereof I hereunto set my hand, this 18th day of March, 1905, in the presence of two attesting witnesses.

AUGUST LINDGREN.

Witnesses:
L. C. BLANDING,
J. L. IRVING.